though a subject inventor: Andrew F. Deming

United States Patent
Deming

[15] 3,694,903
[45] Oct. 3, 1972

[54] METHOD OF MAKING A STATOR
[72] Inventor: Andrew F. Deming, Alliance, Ohio
[73] Assignee: Alliance Manufacturing Company, Inc.
[22] Filed: June 3, 1970
[21] Appl. No.: 43,039

[52] U.S. Cl. ......................29/596, 29/609, 310/216, 310/259, 336/212, 336/234
[51] Int. Cl. ....H02k 15/00, H02k 15/14, H02k 15/16
[58] Field of Search ........29/596, 598, 609; 310/216, 310/259; 83/32; 336/234, 212

[56] References Cited

UNITED STATES PATENTS

| | | | |
|---|---|---|---|
| 2,454,609 | 11/1948 | Miller | 83/32 |
| 2,435,911 | 2/1948 | Van Der Woude | 310/216 UX |
| 509,770 | 11/1893 | Scott | 29/609 X |
| 3,443,137 | 5/1969 | McElroy | 310/216 |

*Primary Examiner*—John F. Campbell
*Assistant Examiner*—Carl E. Hall
*Attorney*—Woodling, Krost, Granger and Rust

[57] ABSTRACT

A two-pole off-set construction of an electric motor has winding portion laminations and rotor portion laminations which are separate so that the winding may be formed or placed on the winding portion and then the two portions of the stator interconnected to complete the flux path for the rotor circumscribed by a rotor aperture in the rotor portion. There must be a window space between these two portions to accommodate the winding on the winding portion and formerly the metal removed from this window space was scrap metal, necessitating an excessive amount of steel lamination material. In this invention, the layer of lamination is made in two complementary pieces and this layer has a rotor portion and a winding portion. The two separate lamination pieces for a layer of complete lamination are to permit the winding to be placed on this complete stator. The material removed from the window space instead of being scrap is utilized as an active flux carrying member by being unitary with one of these first and second lamination pieces. In a first embodiment of the invention the legs joining the end areas of the winding and rotor portions are off-set in the direction toward the winding portion by approximately one-eighth of their length resulting in the bight of the rotor portion, which contains the rotor aperture, being displaced in a direction opposite to the leg extensions. Accordingly, laminations for only the rotor portion are successively formed from a strip of lamination material with the bight of the rotor portion extending into the space between the two legs of the next adjacent rotor portion lamination in the strip of lamination material. In a second embodiment of the invention the rotor and winding portions are unitary on a first piece of the lamination and complementary with a small second piece of lamination. The first pieces of the lamination are nested or interlocked together as they are formed from the lamination steel, utilizing the window space of one piece as the winding portion of the adjacent first lamination piece. This utilizes lamination material from the window space which would otherwise be scrap and saves approxi- utilizes limination material from the window space which would otherwise be scrap and saves approximately one-eighth of the steel used in making the motor. The winding portion or second piece laminations are separately made adjacent to each other in a strip of lamination material. The foregoing abstract is merely a resume of one general application, is not a complete discussion of all principles of operation or applications, and is not to be construed as a limitation on the scope of the claimed subject matter.

24 Claims, 7 Drawing Figures

Fig. 1

INVENTOR.
ANDREW F. DEMING

PATENTED OCT 3 1972

INVENTOR.
ANDREW F. DEMING
BY Woodling, Krost,
Granger and Rust
ATTORNEYS.

METHOD OF MAKING A STATOR

Alternating current motors of the single phase shaded pole type in the sub-fractional horsepower range are very common and are made by the millions. They are used for many different purposes including phonograph drives, tape recorder drives, air-circulating fans in refrigerators and freezers, can openers, rotisserie drive motors and a multitude of others. These may be in the range of one-fiftieth of a horsepower and for economy of manufacture the two-pole off-set construction with only a single winding is currently the most economical. The two-winding type of motor with a yoke surrounding the rotor is a concentric type of motor but is more expensive because of the labor cost of making and fitting two coils. Accordingly, there has been considerable development of the small two-pole shaded pole motors of off-set construction over the last 30 or 40 years. In all of these motors there is a rotor portion with a rotor aperture to contain the rotor and a winding portion to receive the single phase winding. A typical construction for the last several decades has been to make the rotor portion unitary with an annular aperture to receive the rotor and thus the pole tips of the instantaneous north pole are unitary with the pole tips of the instantaneous south pole. This slightly decreases the flux available for running torque of the rotor but is compensated for by better starting and pull-out torque and the fact that the rotor portion of the stator is one piece for ease and facility of manufacture and subsequent assembly. The winding portion of this type of motor is usually separate from the rotor portion, and in any event, each layer of lamination is made from two complementary lamination pieces for ease of assembly of the winding onto the stator and passing through the window space. The stack of laminations is of varying height depending upon the power output required.

The winding is either wound directly on the winding portion of the stator or is wound separately on a bobbin and the bobbin slipped over one end of the winding portion. The two portions of the stator are then forced together in a press at closely fitting junction areas to provide a good flux path in a closed loop including the rotor and winding portions.

Also, in such off-set motor construction there are two legs joining the end areas of the rotor and winding portions and surrounding the window space which accepts the winding. In order to achieve the two part construction of the stator so that the winding may be placed on the winding portion, it is necessary that there be some junction between the winding and rotor portions and this is usually made somewhere on the two legs. This junction may be essentially at the window space edge of the rotor portion in which case the winding portion is generally U-shaped. Another design is to have the junction at the window space edge of the winding portion so that the winding portion is generally a straight bar and thus the rotor portion is essentially U-shaped. An alternative is to have the junction about half way along the two legs in which case both the rotor portion and winding portions are U-shaped.

The typical prior art construction of such off-set type of motor for decades has been to sequentially form the stator laminations from a strip of lamination steel with the material punched from the rotor aperture later being used to form the rotor itself. Also the rotor portions and winding portions alternated in being formed along the length of the strip of lamination steel because the junction lines therebetween, which usually interlocked in some manner, were complementary to each other and hence it was a natural occurrence to have the rotor and winding portions alternating along the strip of lamination material.

In other electromagnetic devices it has been common to attempt to utilize the lamination material to as great an extent as possible. For example, in the manufacture of transformers it has been common for at least 50 to 60 years to use E-I laminations manufactured in the so-called scrapless method. A single I lamination is butted against the ends of a single E lamination. These laminations are stacked, usually with the E's alternating in direction to form a closed magnetic flux path of two yokes around a winding on the center leg of the E. These E and I laminations are punched scrapless, except for rivet holes and the like, by being so proportioned that the I laminations are taken from the space between the bars of the E lamination, with two E laminations facing each other. Despite such knowledge of scrapless laminations for transformers, it has never been heretofore known of scrapless laminations for the off-set construction of electric motors. One off-set construction of single-phase electric motor is known such as shown in U.S. Pat. No. 3,400,083 or 087 wherein the bight of the rotor portion is off-set or displaced relative to the legs, but this stator construction did not utilize this displacement to recover any of the material in the window space for use in the motor. In such prior art motor this displaced bight of the rotor portion was utilized only to achieve a longer junction surface between the rotor portion and winding portion in the hopes of obtaining a lower reluctance flux path. Such motor was about 2.42 inches wide and required a length of lamination material 2.30 inches long and had a window space about 0.54 inches parallel to the length of the motor and none of the metal from this window space was recovered to effectively shorten the length of the motor lamination.

Accordingly, to overcome these disadvantages of the prior art construction which wasted lamination material, it is an object of the present invention to utilize material from the window space to effectively shorten the length of the lamination material required to form the motor.

Another object of the invention is to provide off-set legs on the lamination for the rotor portion of the stator of an electric motor to effectively shorten such legs.

Another object of the invention is to provide an off-set construction electric motor wherein at least a part of the rotor aperture is displaced in a direction opposite to the legs so that the bight of the rotor portion extends between the legs of the next adjacent rotor portion lamination formed in a strip of lamination material.

Another object of the invention is to provide a unitary leg on a rotor portion lamination wherein the leg has a second end area with a shape identical to the metal removed from the first end area opposite the leg extension.

Another object of the invention is to provide a motor stator lamination with at least one leg unitarily attached to a rotor portion and with the leg off-set in one direction relative to the bight of the rotor portion which contains the rotor aperture.

Another object of the invention is to provide a layer of lamination material in two pieces for the stator of an electric motor with a window space for a winding and wherein material removed to form the window space is used as an active flux carrying member by being unitary with one of the first and second lamination pieces.

Another object of the invention is to provide a method of utilizing nested or interlocked laminations wherein the metal removed from a window space on a first lamination piece is unitary with the winding portion of the next adjacent first lamination piece in the lamination strip.

Another object of the invention is to provide a layer of electric motor stator laminations in first and second complementary pieces wherein material from the window space on the stator is used as an active flux carrying member by being unitary with one of the lamination pieces.

SUMMARY OF THE INVENTION

The invention may be incorporated in an electric motor, comprising in combination, a laminated stator and a rotor, a rotor portion and a winding portion on said stator, an aperture in said rotor portion for said rotor, leg means on said stator interconnecting said winding and rotor portions and surrounding a window space, winding means on said winding portion passing through said window space to establish flux in said stator, first and second complementary pieces of lamination material forming a layer in said laminated stator, first edge means on said first lamination piece defining part of said window space, second edge means on said second lamination piece defining another part of said window space, and part of said lamination material removed to form said first edge means of said window space of said first lamination piece being unitary with one of said first and second lamination pieces in said stator as an active flux carrying member.

Other objects and a fuller understanding of the invention may be had by referring to the following description and claims, taken in conjunction with the accompanying drawing.

DESCRIPTION OF THE PREFERRED EMBODIMENT

Figure 1:
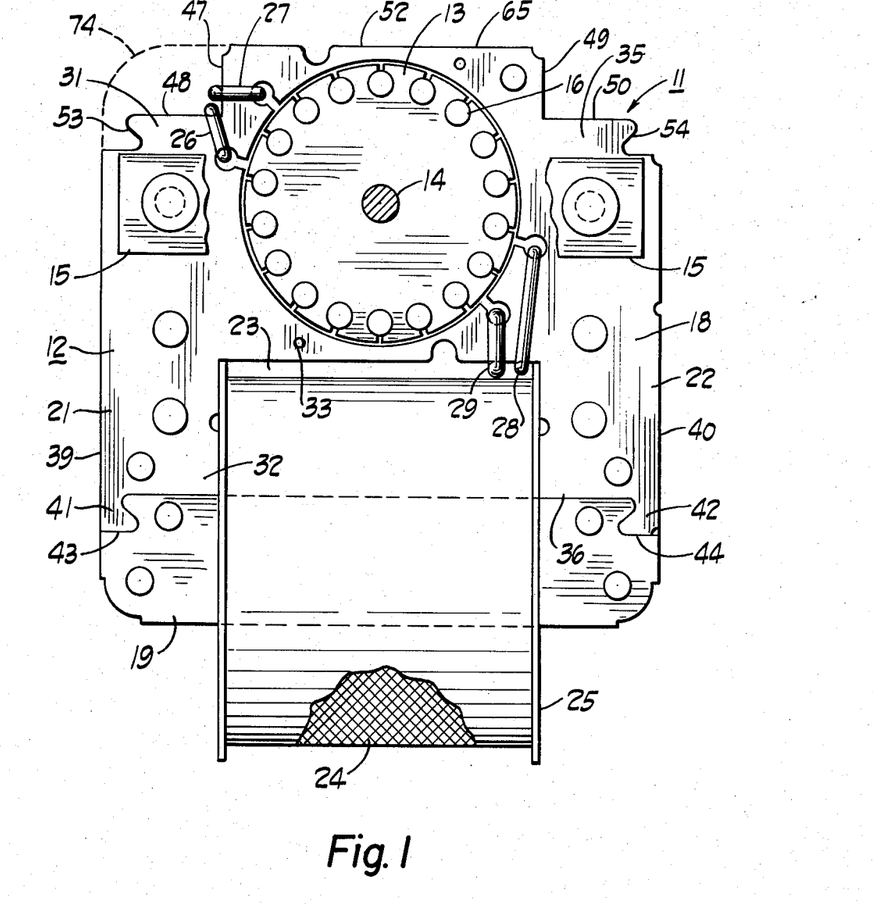
FIG. 1 is a plan view of an electric motor incorporating the invention with the bearing journalling the rotor broken away to better show the construction.
Figure 2:
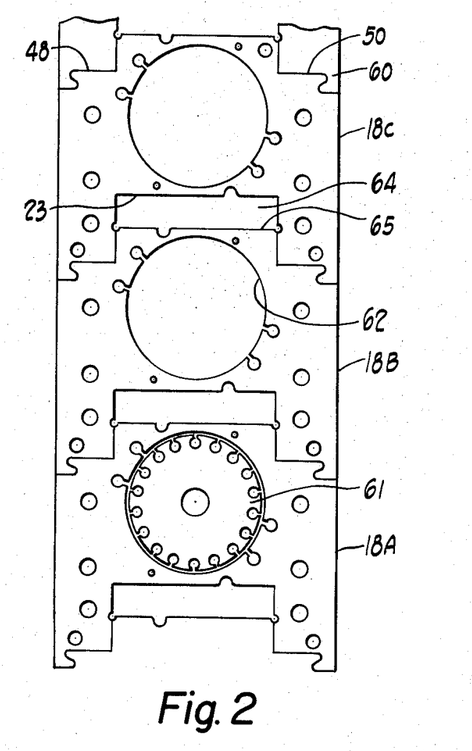
FIG. 2 is a plan view to a reduced scale of a strip of lamination material from which rotor portion stator laminations are formed.
Figure 3:
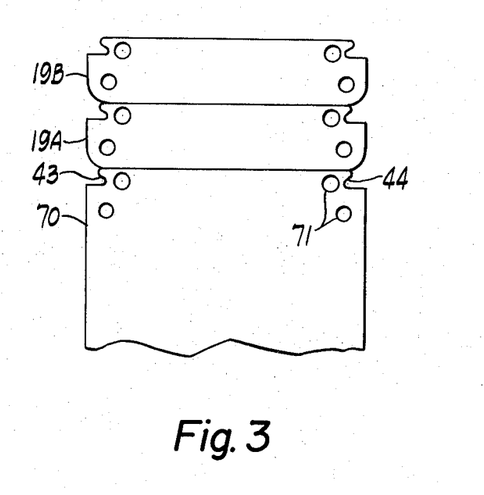
FIG. 3 is a plan view to a reduced scale of a strip of lamination material from which winding portion stator laminations are formed.

The FIGS. 1-3 show a preferred embodiment of an electric motor 11 constructed according to the invention. This motor includes a stator 12 and a rotor 13. The rotor 13 is mounted on a shaft 14 journalled in bearing brackets 15 on either side of the motor in any suitable manner. In FIG. 1 these bearing brackets have been broken away to better show the construction of the stator 12. The rotor 13 has a squirrel cage thereon illustrated by ends of conductor bars 16 illustrated in FIG. 1. This stator 12 is formed from two separate portions, a rotor portion 18 and a winding portion 19. A first leg 21 and a second leg 22 join the end areas of the rotor and winding portions 18 and 19 and surround a window space 23. A single-phase winding 24 is disposed on a bobbin 25 on the winding portion 19 and a part of such winding extends through the window space 23.

The motor 11 is a shaded pole motor and shading coils 26 and 27 surround a portion of the pole tip for one pole shoe and shading coils 28 and 29 surround the diametrically opposite pole tip of the other pole shoe. As illustrated in FIG. 1, the shading coils 26, 27 and 29 may all be the same and shading coil 28 may be a longer wire. Normally shading coil 26 would also be longer for symmetry but in this application it has been found that a small coil is satisfactory because it is a shorter coil in peripheral extent than formerly used.

The first leg 21 has a first end area 31 and a second end area 32. At least the first end area is unitarily attached to the bight 33 of the rotor portion 18. Similarly the second leg 22 has a first end area 35 and a second end area 36 with the first end area 35 which may be unitarily attached to the bight 33 of the rotor portion 18. The first leg 21 has an outer edge 39 remote from the window space 23 and the second leg 22 has an outer edge 40 remote from this window space 23. At least the first leg 21 is unitarily attached to the rotor portion 18 and in this preferred embodiment both legs 21 and 22 are unitarily attached. The second end areas 32 and 36 of the legs 21 and 22 are designed to be attached in flux transmitting relationship to the winding portion 19. To this end interlocking key projections 41 and 42 are provided on the second end areas of the legs 21 and 22 respectively at their outer edges. Both the rotor portion 18 and the winding portion 19 are made from stacks of laminations and each lamination in the rotor portion 18 is identical in this preferred embodiment, also each lamination in the winding portion 19 is identical. Interlocking key apertures 43 and 44 are provided on the two ends of the winding portion 19 to be complementary to the interlocking key projections 41 and 42. Thus, the winding portion 19 and rotor portion 18 may be forced together in a press after the winding 24 is provided on this winding portion 19.

At least the first leg 21 is unitarily attached to the bight 33 of the rotor portion 18 in a position displaced toward the winding portion 19. This is produced by a right angle internal shoulder formed by perpendicular walls 47 and 48. These shoulder walls occur at the first end area 31 with wall 47 parallel to the length of the wall 21 and shoulder wall 48 perpendicular to this length dimension. Similarly the second leg 22 may be unitarily attached to the bight 33 of rotor portion 18 in a position displaced toward the winding portion 19 and displaced an amount the same as the first leg 21. This second leg 22 has right angle shoulder walls 49 and 50 forming an internal right angle shoulder with wall 49 parallel to the length dimension of the leg 22 and shoulder wall 50 perpendicular to this length dimension. The rotor portion 18 has an end wall 52 perpendicular to this length dimension and the two shoulder walls 48 and 50 are displaced therefrom in the direction toward the winding portion 19.

Key apertures 53 and 54 are provided at the first ends of the legs 21 and 22 respectively adjacent the outer edges 39 and 40. These key apertures 53 and 54 are complementary to the key projections 41 and 42, respectively, at the other end of the legs 21 and 22 and these key projections are the longest part of such legs 21 and 22.

FIG. 2 illustrates a strip 60 of lamination material such as lamination steel showing a plurality of nested rotor portion laminations 18A, 18B and 18C illustrating how each of these laminations might be formed from such strip of lamination steel 60. At lamination 18A some or all of the holes may be punched for rivet holes, bearing bracket holes and rotor bar holes for the squirrel cage. At lamination 18B the rotor disc 61 may be punched from the lamination strip leaving the rotor aperture 62, and next the completed rotor portion lamination 18C may be severed to form this completed lamination. In this sequence of steps, which may be carried out by a still greater number of steps in a progressive die or alternatively, may be carried out all in a single step in a compound die, the advantages of the invention will be observed. This nesting of successive laminations shows that the area 64 is all that is scrap in the window space 23 and instead part of this window space is utilized to form the bight projection 65 on the next adjacent lamination in the strip 60. It will be noted that the width of the window space 23 between the legs 21 and 22 is the same as or greater than the width of the bight projection 65; hence, this bight projection may extend into this window space as nested in the series of laminations in the strip 60. In one actual motor construction in accordance with this invention, the stator was 2.5 inches wide and 2.5 inches long. The depth of the recess at the shoulder walls 48 and 50 was made 0.312 inches thus effectively displacing the legs 21 and 22 by this amount. Another way of looking at the matter is that the legs 21 and 22 were effectively shortened by this amount. This was one-eighth of the total length of the motor and this saving came from the window space 23 which otherwise was scrap.

FIG. 3 illustrates a strip of lamination material 70 from which winding portion laminations 19 are successively punched. At 19A the rivet holes 71 may be punched as well as the key apertures 43 and 44. Then at 19B the completed winding portion lamination may be severed from the strip 70. It will be noted that these winding portion laminations are produced in a scrapless manner except for the rivet holes and key apertures.

The winding portion laminations 19 may be stacked and riveted together at a suitable stack height to form the completed winding portion 19. The fact that at least one end of such winding portion 19 is straight permits slipping over such end a completed winding 24 which may be wound on a formed bobbin 25. The rotor portion laminations 18 may be stacked for the same stack height and riveted together to form the rotor portion 18 and then joined in a press with a force fit to the winding portion 19 and interlocked by the key projections 41, 42 and key apertures 43, 44.

It will be observed that the second end areas 32 and 36 of the legs 21 and 22 have a shape which is identical with the metal removed from the first end areas 31 and 35. Alternatively even more metal may be removed at these first end areas if it is desired to make a round corner similar to the round corner in the winding portion 19.

The internal right angle shoulder at the walls 47 and 48 does narrow the flux path into the pole tips in the bight projection 65 and it might have normally been expected that this would degrade the motor performance. However, upon review of the stator structure it has been found that the majority of the flux travels in a loop path which is as short as possible and thus travels through the lower half of the two pole shoes most closely adjacent the window space 23. Thus, inherently there is less flux in the upper half of the two pole shoes remote from the window space 23 even if the recessed internal shoulders at the first ends 31 and 35 were not provided. Applicant has tested this motor for electrical performance as compared to a motor with normal rounded shoulders as shown by the dotted line 74. In such normal motor the shading coils 26 and 27 were similar to a position parallel to the shading coils 28 and 29. The identical rotor was used in each of these two motors being tested, the rotor being removed and placed in the other motor for test purposes. Such test for the normal motor with a normal low resistance squirrel cage rotor and a ½ inch stack showed the following data under prior art motors and compared with the notched shoulder motor of the present invention.

TABLE A

| Motor | Starting Torque (oz. in.) | Pull out Torque (oz. in.) | Max. Efficiency | Watts Out | Starting Torque Per Watt (oz-inch) |
| --- | --- | --- | --- | --- | --- |
| Prior art | 1.7 | 2.85 | 17.6% | 5.95 | .0447 |
| Notched | 1.8 | 3.1 | 18.9% | 6.25 | .047 |

The above table shows that the motor of the present invention actually had slightly superior electrical characteristics of greater starting torque, pull-out torque, efficiency and watts output and as well as starting torque per watt. This was with a nesting of successive laminations of the rotor portion 18 such that a saving of one-eighth of the length was achieved. In an industry wherein millions of such motors are made each month, this is a significant saving in the cost of material. It will be noted that the key projections 41 and 42 are at the outermost edges 39 and 40 and thus when formed in successive laminations from a lamination strip 60, these complementary key apertures 53 and 54 are also at such outer edges. So positioned, these key apertures 53 and 54 do not degrade the electrical performance of the motor and yet permit the complementary key projections 41 and 42 to be the longest part of the rotor portion 18 and to establish interlocking keyed connection with the winding portion 19.

Figure 4:
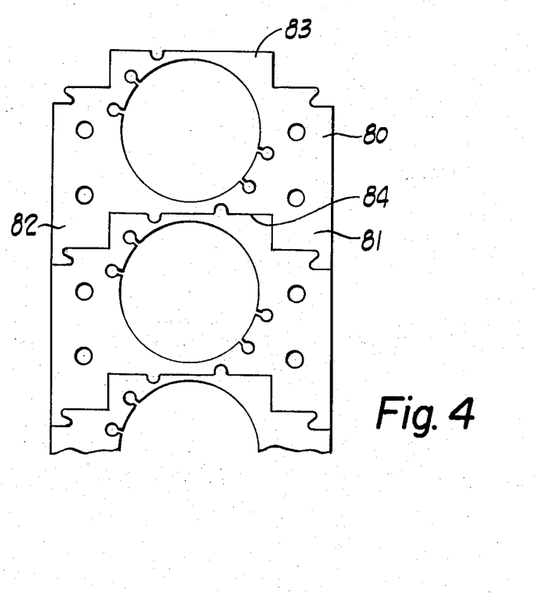
FIG. 4 is a plan view of a modified strip of laminations.

FIG. 4 illustrates a modification of the invention wherein the rotor portion lamination 80 has shorter first and second legs 81 and 82, respectively. These legs are shortened sufficiently to equal the amount of displacement of such legs as unitarily attached to the bight 83 of the rotor portion 80. By this means the entire amount of the window space 84 is recovered for use as the bight projection in the next adjacent lamination. This construction of FIG. 4 may be used with a straight bar winding portion 19 of FIGS. 1-3 if the window space 84 is sufficient for the excitation requirements of the motor. Alternatively the winding portion 19 may have short legs thereon to form a slightly U-shaped winding portion in order to increase the window space for a larger winding.

It will be noted that the motor 11 is constructed in a manner different from that of the prior art construction methods for two-pole off-set motors. In the usual prior art fabrication of laminations, a rotor portion alternated with a winding portion along the length of the lamination strip of material. This was because the rotor portion and winding portion together were generally rectangular, except for the usual rounded corners, and were interconnected at some junction line between the rotor and winding portions. Accordingly, it was considered logical to form these prior art rotor and winding portions in alternating sequence from the strip of lamination material and this has been the method of making such motors for decades. Such method inherently wasted as scrap all of the metal in the window space 23 or 84 whereas the present invention utilizes metal from this window space and effectively shortens the length of the lamination required for a given length of motor 11.

Figure 5:
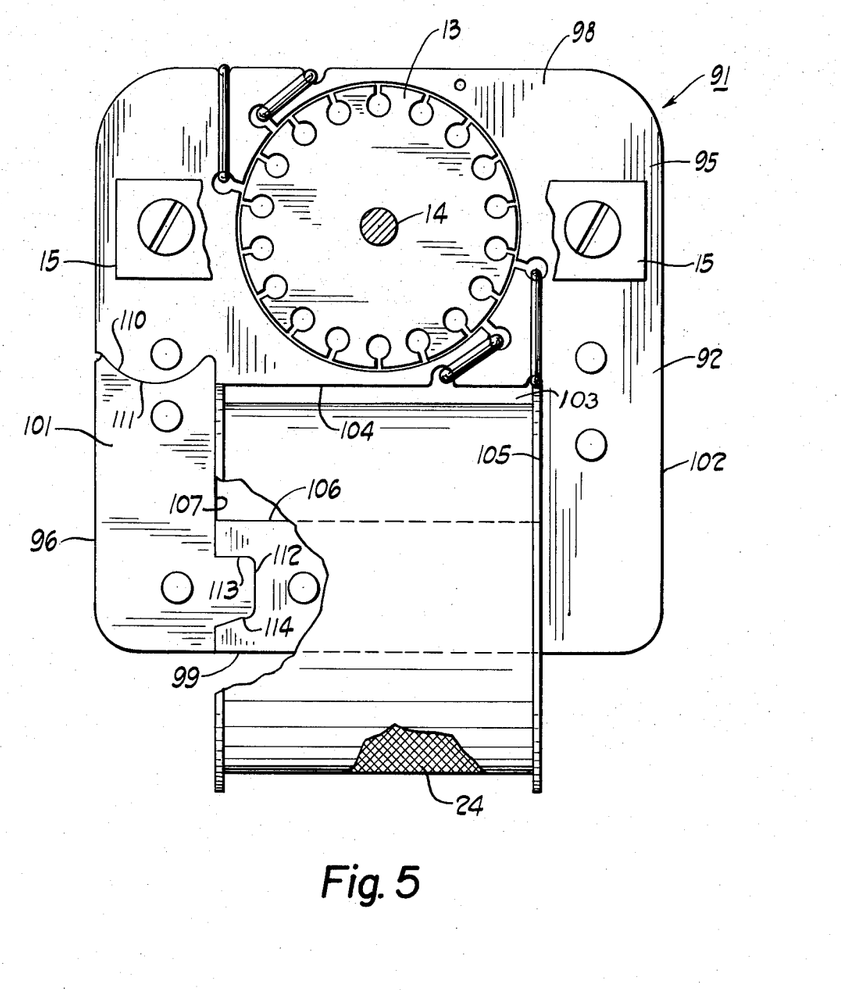
FIG. 5 is a plan view of an electric motor incorporating another embodiment of the invention.
Figure 6:
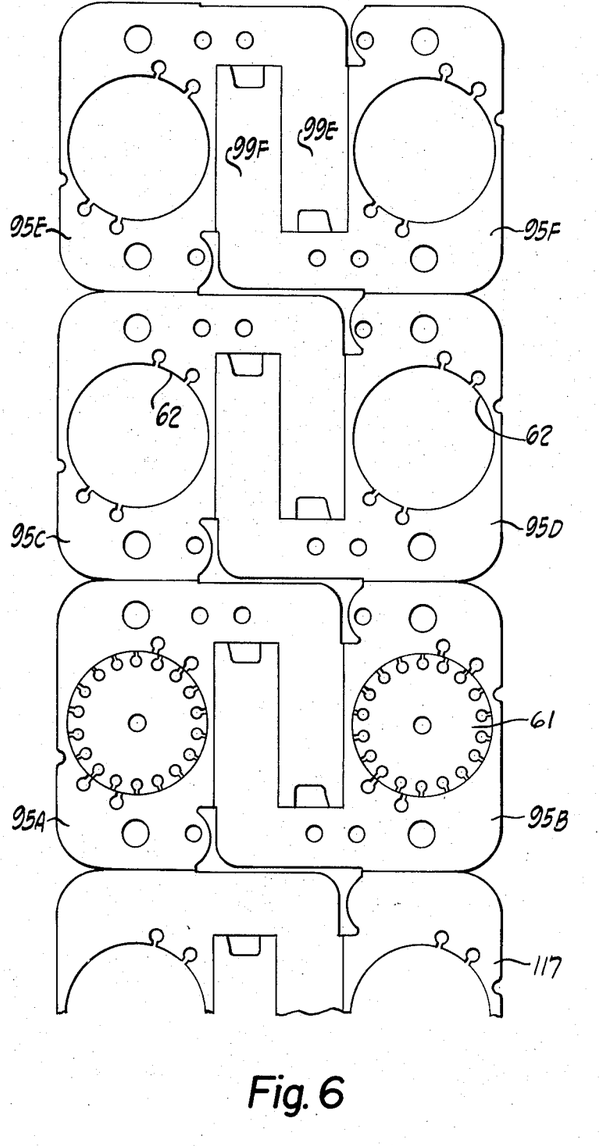
FIG. 6 is a plan view to a reduced scale of a strip of lamination material from which first lamination pieces are formed.
Figure 7:
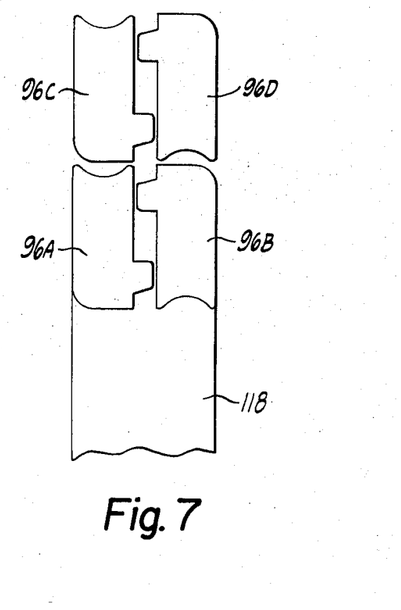
FIG. 7 is a plan view to a reduced scale of a strip of lamination material from which second lamination pieces are formed.

FIGS. 5, 6 and 7 show an alternative construction and method of making the motor and laminations therefor. FIG. 5 is a plan view of an electric motor 91 of this alternative construction. This motor 91 has a stator 92 and the rotor 13. Again the bearing bracket 15 has been broken away to better show the construction of the stator 12. The stator 92 is formed from two stacks of laminations and in this case each layer of the laminations is formed from first and second complementary lamination pieces 95 and 96, respectively. The first lamination piece 95 is larger than the second and includes both a rotor portion 98 and a winding portion 99. First and second legs 101 and 102, respectively, interconnect the rotor portion 98 and winding portion 99 and surround a window space 103. The winding 24 is mounted on the winding portion 99 and passes through the window space 103. This window space is defined by edges 104, 105, 106 and 107 with edges 104, 105 and 106 being on the first lamination piece 95 and with edge 107 being on the second lamination piece 96. The second lamination piece 96 is small in this construction and consists essentially of the first leg 101. An arcuate junction line 110 is provided on the end of the second lamination piece 96 to be complementary to another arcuate junction line 111 on the first lamination piece 95. An interlocking junction line 112 is provided on the second lamination piece 96 complementary to an interlocking junction line 113 on the first lamination piece 95 at the end of the winding portion 99. The stack of first lamination pieces 95 may be fastened together in any suitable manner such as being riveted, and the stack of second lamination pieces 96 may also be fastened together in any suitable manner. After the winding 24 is assembled on the winding portion 99, then the stack of second lamination pieces 96, which is essentially the first leg 101, may be forced by a press to arcuately swing on the junction lines 110, 111 and to have the interlocking junction lines 112, and 113 interfit, as aided by a tang 114 and thus fit together to form the complete stator 92. With this completed stator it will be noted that the window space 103 is defined by the four edges 104-107 and that three of these edges 104, 105 and 106 are provided on the first lamination piece 95 whereas the fourth edge 107 is provided on the second lamination piece 96.

FIG. 6 shows a strip 117 of lamination material such as lamination steel and shows a sequence 95A through 95F for successively forming the first lamination pieces 95 from this strip 117. At 95A and B some of the holes for the rotor and stator may be formed, for example, and at 95 C and D the rotor lamination may be punched out to reveal the rotor aperture 62, as well as other notches or cuts made to better shape the lamination piece. At 95E and F the entire end portion may be removed, for example, to form two of these first lamination pieces 95. At 95E and F of FIG. 6, it will be noted that there are two such first lamination pieces which are nested or intermeshed. The winding portion 99E on lamination piece 95E is intermeshed with the winding portion 99F of the lamination piece 95F. Thus the material removed to form the window space of the lamination piece 95F becomes the winding portion 99E for the lamination piece 95E. Accordingly, it will be seen that this is essentially a scrapless method of forming these laminations, except of course for the necessary rivet holes and shaping of the piece, for example, the rounding of the corners and the forming of the interlocking junction lines.

FIG. 7 shows a strip of lamination material such as lamination steel 118 on which second lamination pieces 96A, B, C and D are indicated. These pieces may also be run in pairs with lamination pieces 96A and B being partially formed from the lamination strip 118, for example, by punching out material for rivet holes and beginning to shape the lamination pieces. At 96C and 96D the completed lamination pieces may be severed from the strip 118. These pieces are partially L-shaped with the shapes interlocking to be substantially scrapless in the method of manufacture.

Again in the construction of the motor shown in FIGS. 5, 6 and 7, it will be noted that first lamination pieces 95 are made in succession from one strip and the second lamination pieces 96 are made in succession from another strip. Again this is contrary to the usual prior art construction wherein the first and second lamination pieces are formed alternately along the strip of lamination material, and are severed from each other along the interlocking junction lines at which they will later be rejoined. In this embodiment all first pieces of the lamination are made contiguous or adjacent to each other in the lamination strip and all second lamination pieces are made contiguous or adjacent to each other in another strip or another portion of this same strip. This embodiment illustrates that material removed from the window space of the layer of stator lamination is used as an active flux carrying member. In this embodiment of FIGS. 5–7, the material so removed from the first lamination piece is used as an active flux carrying member on the next adjacent first lamination piece. This is similar to that embodiment shown in FIGS. 1–3, wherein material removed from the window space of the lamination piece forming the rotor 18 was used in the next adjacent lamination of that same type forming the rotor portion 18, and used as an active flux carrying member at the pole shoes adjacent the rotor 13.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in details of construction and the combination and arrangement of parts may be resorted to without departing from the spirit and the scope of the invention as hereinafter claimed.

I claim:

1. The method of making an electric motor with a stator and a rotor,
   said stator having a rotor receiving portion to accommodate the rotor of the motor and having a winding receiving portion to accommodate a winding,
   said stator having first and second legs interconnecting said rotor and winding receiving portions and surrounding a window space through which passes a winding on the winding receiving portion,
   comprising the steps of,
   forming a rotor aperture in a succession of identical first lamination pieces from a strip of lamination material with each first lamination piece being adjacent another first lamination piece in the lamination material strip,
   forming a succession of identical second lamination pieces from lamination material with each second lamination piece being complementary to the first lamination piece in the stator,
   the forming of one of the first and second lamination pieces including removing material from one such piece to form an edge of the window space and at least part of such window space material being unitary with a next adjacent lamination piece in the strip of lamination material as an active flux carrying member,
   stacking said first lamination pieces to form a stack having a desired height,
   stacking said second lamination pieces to form a stack having a desired height,
   fastening the two stacks together to form a stator,
   and mounting a rotor in said rotor apertures.

2. The method as set forth in claim 1, wherein the material removed from a first lamination piece to establish the window space is unitary with the next adjacent first lamination piece in the strip of lamination material.

3. The method as set forth in claim 1, wherein said window space is defined by four edges to be generally rectangular, and forming three of said edges on said first lamination piece.

4. The method as set forth in claim 1, including forming interlocking key projections and apertures on said lamination pieces to co-act together as the fastening means for the two stacks.

5. The method as set forth in claim 1, including forming said first lamination pieces in succession from a strip of lamination material with edges of one first lamination piece being contiguous with edges of the next adjacent first lamination piece in said strip.

6. The method as set forth in claim 5, including forming said first lamination pieces all oriented in the same direction in said strip.

7. The method as set forth in claim 5, including forming said first lamination pieces alternating in orientation along said strip.

8. The method as set forth in claim 7, including forming one of said first lamination pieces with the winding receiving portion thereof including material removed from the window space of a second one of said first lamination pieces contiguous therewith in the strip of lamination material.

9. The method as set forth in claim 7, including forming two adjacent first lamination pieces from said lamination strip as being intermeshed.

10. The method as set forth in claim 1, including forming said rotor receiving portion on said first lamination piece and forming said winding receiving portion on said second lamination piece.

11. The method as set forth in claim 1, including forming said rotor receiving portion and said winding receiving portion on said first lamination piece and forming said first leg substantially as said second lamination piece.

12. The method of forming a stator for an electric motor having a rotor and a winding comprising the steps of,
    forming the stator in first and second portions for a rotor receiving portion and a winding receiving portion, respectively,
    forming said rotor receiving portion of the stator from a plurality of stacked magnetically permeable laminations each having a bight portion for a rotor aperture and each having at least a first leg,
    the entire stator having said first and a second leg with end areas thereof joining the rotor and winding receiving portions and surrounding a window space to receive a winding,
    and successively forming each of the rotor receiving portion laminations in sequence from a strip of lamination material including forming the first leg unitarily attached to the bight of the rotor receiving portion displaced in a first direction toward the winding receiving portion and with the first leg having first and second end areas with the first end area being at said bight of the rotor receiving portion and having metal removed therefrom at least sufficient to form the second end area identical in shape thereto on the next adjacent lamination formed from the strip of lamination material.

13. The method as set forth in claim 12, including forming said second leg unitarily with said rotor receiving portion.

14. The method as set forth in claim 13, including forming said second leg unitarily attached to the bight of the rotor receiving portion displaced in a direction toward the winding receiving portion.

15. The method as set forth in claim 14, including removing material from the bight of the rotor receiving portion to form a rotor aperture a portion of which is displaced beyond said first end area of said first and second legs in a second direction opposite to said first direction.

16. The method as set forth in claim 13, including forming the bight of the rotor receiving portion with a width no greater than the width between said first and second legs to permit the bight portion of one rotor receiving portion lamination to extend into the space between said first and second legs of the next adjacent lamination in said strip.

17. The method as set forth in claim 12, including progressively forming winding receiving portion laminations from a strip of lamination material with each of said winding receiving portion laminations being adjacent another winding receiving portion lamination in said strip.

18. The method as set forth in claim 16, wherein said winding receiving portion laminations have at least one end which is straight,
stacking said winding receiving portion laminations and sliding a completed coil over said straight end of said stacked laminations.

19. The method as set forth in claim 16, wherein both ends of said winding receiving portion laminations are straight to permit sliding a completed coil over either end thereof.

20. The method as set forth in claim 12, including forming a right angled internal shoulder at said first end area which is complementary to a right-angled exterior shoulder at said second end area.

21. The method as set forth in claim 12, including forming a key projection on the second end area,
and forming a complementary key aperture on said winding receiving portion of said stator.

22. The method as set forth in claim 21, including forming a key aperture at said first end area complementary to said key projection.

23. The method as set forth in claim 12, including forming a key projection on said second end area which is the longest part of said first leg and is on the outermost edge of said first leg remote from said window space.

24. The method as set forth in claim 23, including forming a key aperture at said first end area complementary to said key projection and on the outermost edge of said first leg remote from said window space.

* * * * *